(No Model.) 3 Sheets—Sheet 1.
W. THOMSON.
APPARATUS FOR MEASURING AND RECORDING ELECTRIC CURRENTS.
No. 521,394. Patented June 12, 1894.
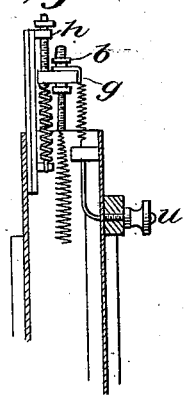
Fig. 3.
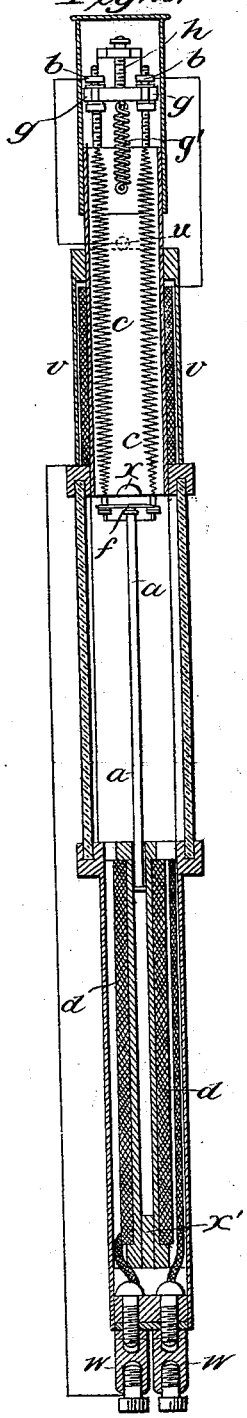
Fig. 2.
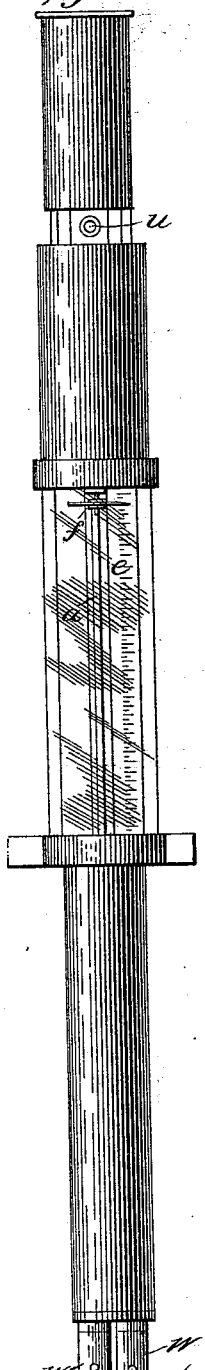
Fig. 1.
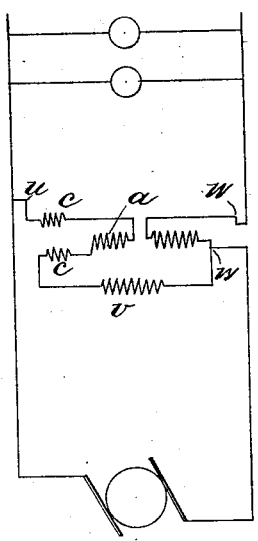
Fig. 3.ª
Witnesses:
Chas. F. Miller
S. Allen
Inventor
William Thomson
By Knight Bro
Attys.

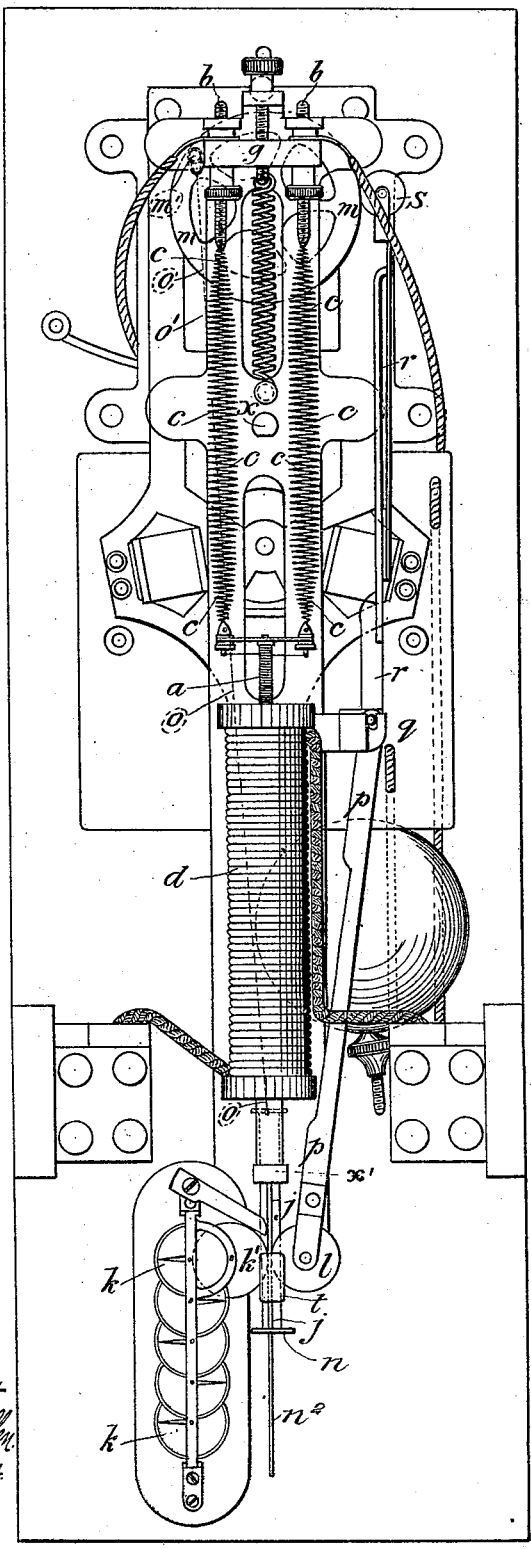

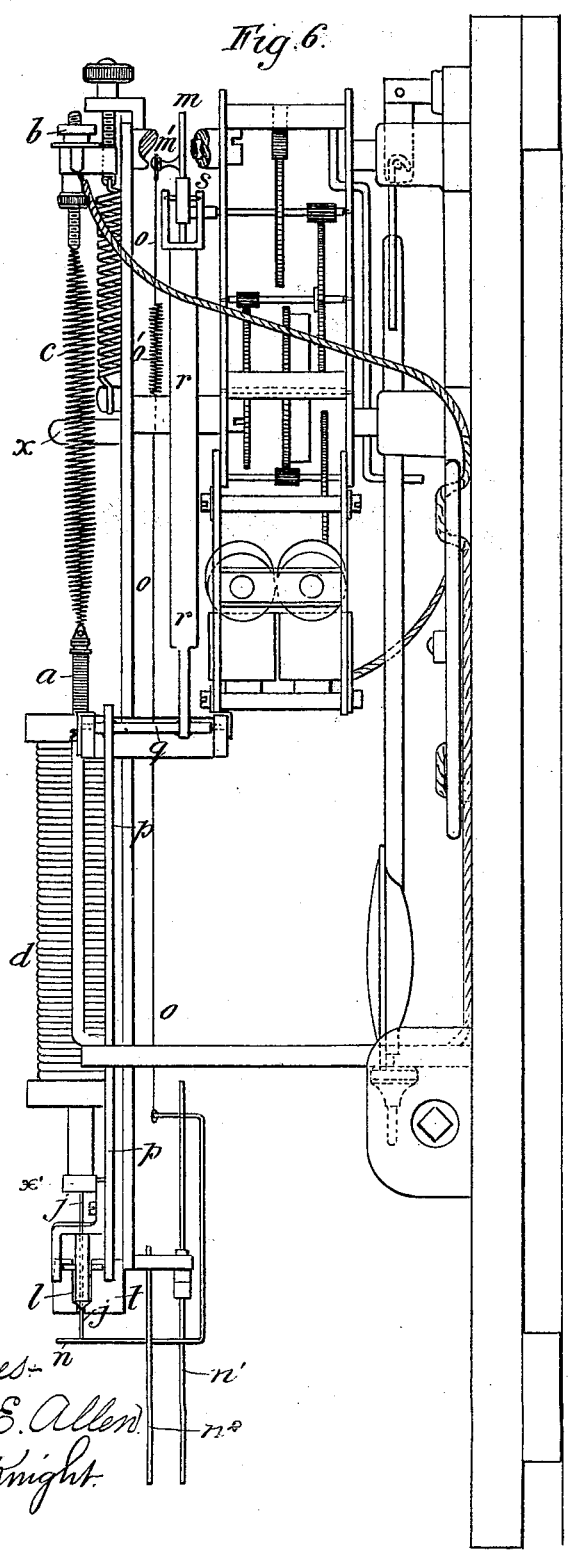

UNITED STATES PATENT OFFICE.

WILLIAM THOMSON, OF GLASGOW, SCOTLAND.

APPARATUS FOR MEASURING AND RECORDING ELECTRIC CURRENTS.

SPECIFICATION forming part of Letters Patent No. 521,394, dated June 12, 1894.

Application filed February 8, 1893. Serial No. 461,547. (No model.) Patented in England October 27, 1891, No. 18,436.

*To all whom it may concern:*

Be it known that I, WILLIAM THOMSON, Baron Kelvin of Largs, professor of natural philosophy in the University of Glasgow, a subject of the Queen of Great Britain, residing at Glasgow, in the county of Lanark, Scotland, have invented an Improved Apparatus for Measuring and Recording Electric Currents, (for which I have obtained English Letters Patent, No. 18,436, of October 27, 1891,) of which the following is a specification.

As a simple instrument for measuring electric currents I use a permanent or electro-magnet attracted by a fixed solenoid, and carrying a pointer which moves past a graduated plate or scale, and this magnet is suspended in the proper relation to the fixed solenoid by two fine oppositely coiled spiral springs, which, in the use of an electro-magnet form the conductors for its helix. The current to be measured passes through the fixed solenoid attracting inward the movable magnet, with a force which is very nearly the same at all times for the same strength of current through the fixed solenoid, and very nearly proportionate to the strength of this current through a wide range of motion of the movable magnet within the fixed solenoid provided that the electro-magnet is kept magnetized nearly to saturation. Thus the strength of the current through the fixed solenoid may be very approximately read off on the straight scale of equal divisions indicating the distance through which the movable electro-magnet is pulled against the force of its bearing springs when it is hung as described above.

To measure the total quantity of electricity, I combine with the above simple instrument, a counter or recorder which is actuated at periodic intervals of time by a constantly revolving cam, through the medium of a projection carried on, and thereby controlled in its position by the electro-magnet, which is in turn determined in its position by the strength of current passing, and the relation of the parts is such that the extent of movement of the recorder at each impulse varies according to the extent of previous depression of the magnet with its projection, or in other words, depends on the strength of the current passing.

The details in the construction of such devices will be more readily understood upon reference to the drawings and description thereof.

In the accompanying drawings:—Figure 1 is an elevation of the simple form of the instrument. Fig. 2 is a vertical section of the same. Fig. 3 is a vertical section of the upper part taken at right angles to that shown by Fig. 2. Fig. $3^a$ is a diagram of the electrical connections. Fig. 4 is an elevation of an instrument designed for recording the total quantity of electricity used. Fig. $4^a$ is a detail view of the constantly rotating cam wheel. Fig. 5 is a section of the fixed solenoid. Fig. $5^a$ is a detail view of a part of Fig. 5 on an enlarged scale. Fig. $5^b$ is a similar view of a modification. Fig. 6 is an end view of the recording instrument.

In carrying out the first part of my invention, which is shown in Figs. 1 to 3, I use a movable electro-magnet $a$ consisting of a thin bar of soft iron with a helix of fine insulated wire wound upon it. The two ends of this helix wire are connected with fixed binding screws $b$, $b$, by two fine elastic wires $c$, $c$, which may be in the shape of spiral springs as shown and which bear the weight of the electro-magnet and oppose, with a yielding force, its attraction by the fixed solenoid. The current to be measured, passes through a fixed solenoid $d$, entering and leaving through terminals $w$, $w$, and attracting inward, one end of the movable electro-magnet. From one of the binding screws $b$, $b$, a connection is made to the terminal $u$, while from the other, a connection is made to one end of an anti-inductive resistance $v$, $v$, whose other end is joined to one of the terminals $w$, $w$, of the fixed solenoid $d$, $d$. This anti-inductive resistance is sufficient to insure the magnetizing of the core nearly to saturation by the current passing through the helix of the movable electro-magnet. Two stops $x$, $x'$ are placed so as to regulate the range of the electro-magnet and insure it against being thrown out of the fixed coil $d$ or being drawn by the attraction of the fixed solenoid so far as to cause damage. I find that the force of this attraction is at all times very nearly the same for the same strength of current through the fixed solenoid and very nearly in simple proportion to the strength of this current through a wide range of motion of the movable electro-magnet, provided the magnetizing force of the current in the electro-magnet is sufficiently strong to magnetize the soft iron nearly to saturation. Thus the strength of the current through the fixed solenoid may be very approximately read off on a straight scale $e$ of equal divisions by means of a pointer $f$ indicating the distance through which the movable electro-magnet is pulled against the force of its bearing springs. The springs used to suspend the movable electro-magnet are made one right-handed and the other left-handed, so that when the electro-magnet is pulled down, the tendencies of the springs to uncoil being approximately equal and opposite, the parallelism of the line of motion of the pointer $f$ to the scale $e$ is preserved and friction avoided. The binding screws $b$, $b$ are carried by a piece of vulcanite $g$, $g$, or other insulating material, which can be raised or lowered, a little in opposition to spring $g'$ by means of the screw $h$ in order to adjust the pointer to the zero of the scale. When the instrument is used to measure currents such as those supplied by a dynamo machine or electric battery, see Fig. $3^a$ the fixed solenoid is inserted in the circuit of the current to be measured by means of the binding screws $w$, $w$, and a connection is taken from the binding screw $u$ to the main from the other pole of the battery or dynamo.

By combining suitable recording and actuating mechanism with the above-described simple instrument, used as a controlling element, I obtain a meter for measuring the total quantity of electricity supplied, as will be understood upon reference to Figs. 4 to 6 of the accompanying drawings.

The electrical controlling or measuring part of the instrument is similar in every respect to that already described, except that I attach a guiding tube $i$ at the bottom end of the electro-magnet $a$, and provide a loose light bar $j$ having a head $j'$ resting on an inturned flange $i'$ on the bottom of the guiding tube $i$, see Figs. 5 and $5^a$. The construction of the bar $j$ is such that when free from the gripping rollers to be referred to, it will hang upon the guide tube which is carried by the magnet $a$, but it may be moved upward in said tube without changing the position of the magnet. The range of the electro-magnet $a$ is fixed by stops $x$ and $x'$, and the end of the bar $j$ is guided by the cheeks $t$ and the opening in the stop $x'$.

$k$ is a recorder having a roller $k'$ formed with a broad flat rim and capable of rotating in one direction. The loose bar $j$ hangs between the rim of this roller $k'$ and another roller $l$ which is carried by an arm $p$ fixed upon a turning shaft $q$ which is controlled in its movement by an upwardly extending flexible arm $r$. This arm $r$ carries at its free end a roller $s$, which bears upon the face of a cam $m$ which is kept constantly revolving by suitable clockwork C, and is of such shape, (see Fig. $4^a$) that at regularly recurring intervals, and through the medium of arms $r$ and $p$, it forces the roller $l$ toward the roller $k'$, and grips the bar $j$, while at the same time, and actuated by the same cam wheel $m$, a presser-foot $n$ mounted on guides $n'$, $n^2$, is raised and forces upward the bar $j$ to its upper limit, at which time the presser-foot touches the lower surface of the cheeks $t$ and is arrested in its movement. Now the bar $j$ has been gripped between the roller $k'$ and $l$ during its upward movement, and consequently this upward movement of said bar imparts movement to the roller $k'$ and causes it to turn through a space proportional to the distance through which the bar $j$ moves. Furthermore it will be seen that as the bar hangs from the magnet the depression of said bar depends upon the attraction of the magnet and therefore is proportional to the amount of current at the time passing through the fixed coil $d$.

The zero position of the electro-magnet $a$ is adjusted so that the extreme end of the bar $j$ is just permitted to touch the foot $n$ when the latter is drawn up against the lower surface of the guiding cheeks $t$, and as the bar is moved back each time to its zero position, from its point of depression, it becomes evident that the extent of movement of the recorder depends upon the depression and consequently upon the strength of the current, at the time, passing.

The cam wheel $m$ which is kept revolving uniformly by clockwork, elevates the foot $n$ by an eccentric stud $m'$, Fig. 6, which is connected to said foot $n$, by a fine connecting wire $o$, and interposed spiral spring $o'$. As the cam wheel revolves and its stud rises or falls the foot $n$ is raised till it presses against the lower surface of the guiding cheeks $t$, and lowered till it is below the lowest possible position of the rod $j$, and this raising movement takes place while the rod $j$ is forced against roller $k'$. The cam wheel is shown detached at Fig. $4^a$, and it will be seen that part of the circumference is of larger radius than the other part. While the portion of the cam wheel $m$ which is of larger radius is passing the roller $s$, the roller $l$ is pressed toward $k'$, and the loose piece $j$ is nipped between the rollers $l$ and $k'$. At this time the foot $n$ is at the bottom of its range, and begins to rise. If the current is passing through the fixed coil $d$, the electro-magnet $a$ and consequently the bar $j$ is pulled down a corresponding distance, and the foot $n$, in its upward motion, carries the bar $j$ back to its zero position, and at the same time turning the rolling wheel $k'$. When the foot $n$ first touches the lower surface of the guiding cheeks $t$, the stud $m'$ is not quite at its highest position, but as it continues to rise the connection yields by reason of the interposed spring. When the stud $m'$ begins to fall the spring contracts, and at the same time, the bar $j$ is unclamped from between the rollers $k'$ and $l$, so that by the time the foot begins to fall, the bar $j$ is hanging quite free. When no current is passing, the bar $j$ is clamped at its zero position, and the foot $n$ on being lifted touches the end of the bar $j$ and the lower surface of the cheeks $t$ at the same time and no record is made on the roller $k'$.

The bar may be firmly attached to the electro-magnet as shown in Fig. 5$^b$ in which case the electro-magnet is caused to move with the bar by the action of the rollers. Or it may rest on the bottom of a guiding tube firmly attached to the electro-magnet, as shown in Fig. 5$^a$ and thus the electro-magnet may not be compelled to follow the bar through the whole space of its motion to the zero-stop.

I claim—

1. In an electric meter, the combination of the fixed solenoid carrying a scale, the movable magnet carrying an indicator and a yielding support for holding the magnet normally in elevation and in proper relation to be attracted by the solenoid, substantially as described.

2. In an electric meter, the combination of the fixed solenoid energized by the current to be measured, the movable magnet supported in proper relation to be attracted by the solenoid, and the yielding support for holding the movable magnet normally in elevation, consisting of a pair of oppositely wound spiral springs, substantially as set forth.

3. In an electric meter, the combination of the fixed solenoid energized by the current to be measured, the movable electro-magnet supported in proper relation to be attracted by the solenoid, the yielding support for the movable magnet forming conductors for its winding and suitable conductors for supplying current to the movable electro-magnet, as and for the purpose set forth.

4. In an electric meter, the combination of the fixed solenoid energized by the current to be measured, the movable electro-magnet supported in proper relation to be attracted by said solenoid, the spiral springs affording a yielding support for the electro-magnet and conductors for its winding, and a suitable resistance for controlling the energizing of the movable magnet, substantially as and for the purpose set forth.

5. In an electric meter, the combination with the fixed solenoid and the movable magnet yieldingly supported in proper relation to be attracted by said solenoid; of the device for recording the extent of relative movement between the solenoid and magnet, and a suitable clock-work for periodically establishing working connection between the movable magnet and the recorder, substantially as described.

6. The combination of a fixed solenoid, a movable magnet yieldingly supported in proper relation to be attracted by the fixed solenoid, a suitable recording device, and a clock-work having a periodically reciprocating presser-foot, a longitudinally movable bar $j$, supported by the movable magnet in the path of the presser-foot and periodically returned to normal position by the same, and an arm controlled by the clock-work for forcing the bar $j$ into actuating relation with the clock-work simultaneously with the movement of said bar by the presser-foot, substantially as and for the purpose explained.

7. In an electric meter, the combination of the fixed and movable magnets, the longitudinal bar $j$, controlled in its position by the movable magnet, a recording device actuated by the longitudinal movement of the bar when forced into engagement therewith, and a clock-work having connections for periodically moving the bar and simultaneously forcing the same into engagement with the recording device, substantially as and for the purpose set forth.

In testimony whereof I have signed my name to this specification in the presence of two witnesses.

WILLIAM THOMSON.

Witnesses:
JOHN LIDDLE,
 *Patent Agent, Glasgow.*
ARTHUR HARTLEY YUILE,
 154 *St. Vincent Street, Glasgow.*